March 14, 1961  S. BÖHM ET AL  2,974,574
PHOTOGRAPHIC CAMERAS WITH ADJUSTABLE EMULSION CARRIER GUIDE
Filed Sept. 19, 1957  2 Sheets-Sheet 1
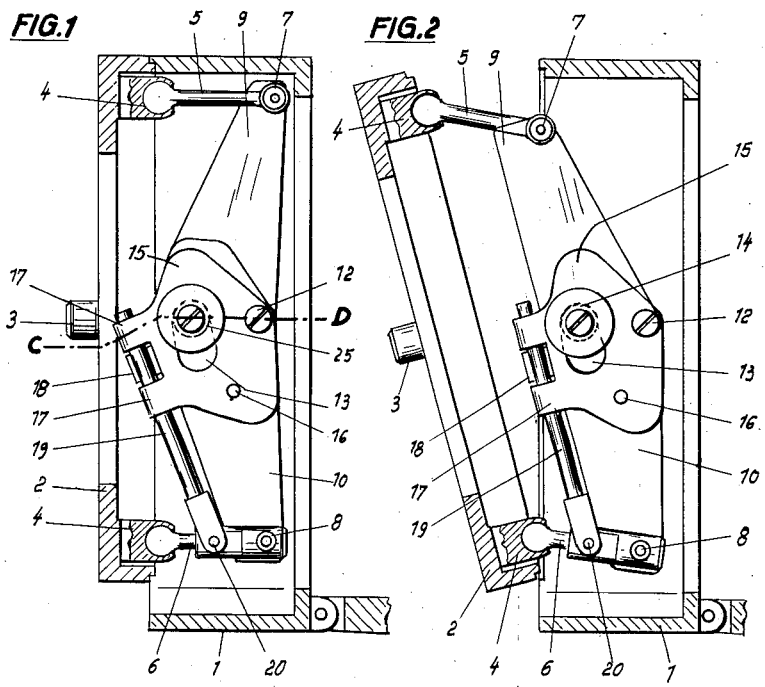
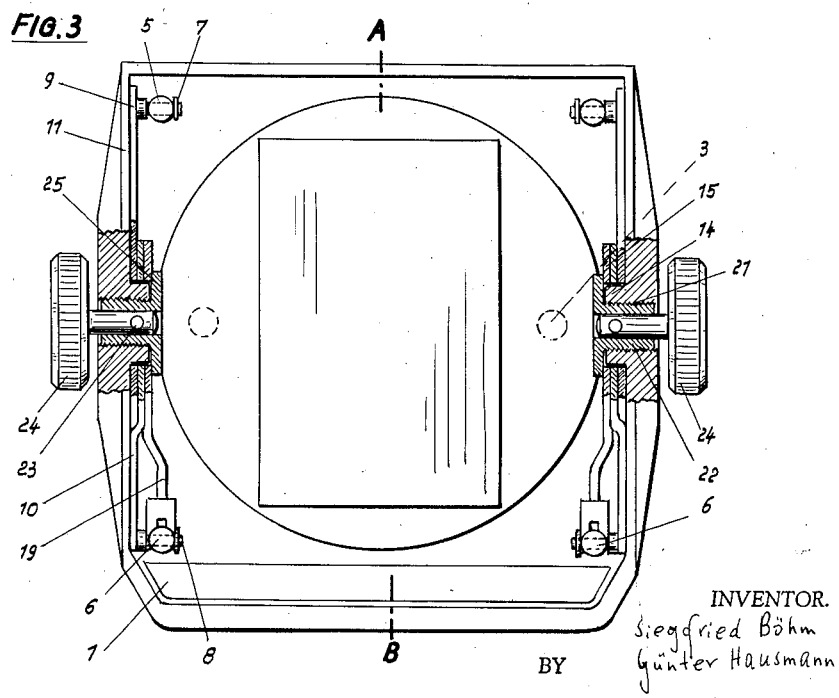
INVENTOR.
Siegfried Böhm
Günter Hausmann
BY

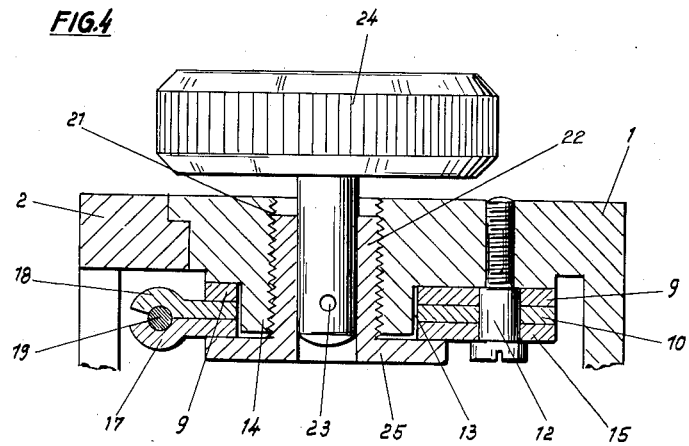

2,974,574
Patented Mar. 14, 1961

2,974,574

PHOTOGRAPHIC CAMERAS WITH ADJUSTABLE EMULSION CARRIER GUIDE

Siegfried Böhm and Günter Hausmann, Dresden, Germany, assignors to VEB Kamera- und Kinowerke Dresden Filed Sept. 19, 1957, Ser. No. 684,879

8 Claims. (Cl. 95—50)

This invention relates to a photographic camera provided with means for the movable arrangement of the emulsion carrier guide or focussing screen frame.

Photographic cameras are known in which for compensating tumbling lines the emulsion carrier guide or the focussing screen is movably disposed in the camera body and can be so adjusted to obtain pictures free from distortion. In one of these known cameras adjustability of the emulsion carrier guide is effected by employing for its bearing joints formed of pins guided with clearance in parallel guides in the corners of the camera body, each pin being separately clamped in its adjusted position by eccentrics. In another camera these parallel guides are provided in the center of the camera between the four corners and not in the corners of the focussing screen frame in order to obtain medium definition of the object at any inclination of the focussing screen frame.

These known arrangements suffer, however, from the drawback that at each adjustment of the emulsion carrier guide or focussing screen frame each hinge pin has to be individually released and then fixed again after adjustment. This kind of adjustability is not only bothersome but also uncertain in so far as it is difficult accurately to fix the emulsion carrier guide in the oblique position required in each case by means of its four joints which have to be individually actuated. Another disadvantage is that parallel guiding of the hinge pins in spite of the clearance provided does not permit vertical adjustment of the emulsion carrier guide and therefore no compensation in this direction.

The invention eliminates these disadvantages by providing for movable arrangement of the emulsion carrier guide or focussing screen frame in photographic cameras, whereby in a very simple manner the emulsion carrier guide can be quickly and securely placed in the position required for obtaining undistorted exposures and also sufficiently adjusted in vertical direction. Setting of the emulsion carrier guide in inclined position as well as upwardly and downwardly is effected in a particularly advantageous way by only two operating elements.

The emulsion carrier guide is supported according to the invention by guides preferably supported at its corners and held by pairs of swivel members provided on the side walls of the camera and fixed or released in adjusted position at their common turning point by operating elements arranged on both sides of the camera. Furthermore, on the pivot bolt of the pairs of swivel members a hinged straight guide ensures adjustability of the emulsion carrier guide in a vertical direction and is connected with the swivel members for joint motion therewith so as to be released or fixed with them.

Two embodiments of the invention are illustrated in the accompanying drawings wherein parts not needed for understanding the invention are omitted.

Figure 1 is a vertical section on the line A—B of the camera shown in Figure 3 with the emulsion carrier guide in normal taking position;

Fig. 2 is a section view as shown in Fig. 1 but with the emulsion carrier guide in inclined position;

Fig. 3, a front view, partly in section, of the arrangement of the emulsion carrier guide inside the camera;

Fig. 4, a section on the line C—D showing the elements for releasing and fixing the emulsion carrier guide in its respective position; and Fig. 5, a section of another embodiment.

In the construction shown in Figs. 1 to 4 numeral 1 indicates the camera body and 2 the emulsion carrier guide fitted with guide pins 3 which serve for receiving the focussing screen frame or roll film magazine, not shown. In the corners of the emulsion carrier guide 2 journals 4 hold guides 5, 6 one end of which has a spherical shape. Their other ends are journalled by bolts 7, 8 to swivel members 9, 10 which are formed as single armed levers and inside the camera body on the side walls 11 and are swivelled in pairs about a common pivot bolt 12. The pairs of swivel members 9, 10 have a slot 13 disposed concentrically relative to the pivot bolt 12 and embracing a bearing collar 14 provided on the two side walls 11 of the camera to permit unobstructed motion of the swivel members 9, 10 about the pivot bolt 12 within range of the slot 13, the collar 14 limiting the two end positions of the swinging movement.

Beside each pair of swivel members 9, 10 an additional swivel member 15 is provided. The swivel members 15 also possess a longitudinal slot 13 like the pairs of swivel members 9, 10 and like them are movably disposed on the pivot bolt 12. Each swivel member 15 is coupled with the swivel member 9 by a carrier pin 16. The swivel member 15 and the swivel member 9 are each fitted with a semicircular guide 17, 18 which guides cooperate in hingelike fashion and together form a round guide as indicated in Figs. 4, 5. In this round guide slides a rod 19 which is pivotally connected to the lower guides 6 by means of bolts 20.

The bearing collars 14 provided on the side walls of the camera possess internal thread 21 by which a correspondingly threaded clamping member 22 is guided. By a pin 23 this member is firmly connected with an operating knob 24 and by the actuation or rotation thereof correspondingly moved in axial direction. The clamping member 22 has a rim 25 whose diameter is greater than that of the bearing collar 14. When the operating knob 24 is turned, the swivel members 9, 10 and 15 arranged side by side around the bearing collar 14 are fixed or released in their adjusted position by the clamping action exerted by the clamping member 22 and its rim 25.

The mode of operation of the arrangement described is as follows:

When the emulsion carrier guide 2 is to be inclined to obtain undistorted exposures, the clamping action produced by members 22 is caused to cease by turning the operating knobs 24, whereby the pairs of swivel members 9, 10 together with the emulsion carrier guide becomes freely movable and can be readily placed in the position required. Owing to the hinged arrangement of the pairs of swivel members 9, 10 about a common turning point and the similar connection of the guides 5, 6 with the emulsion carrier guide 2, there is sufficient mobility provided for inclined vertical and horizontal adjustment as well as for adjustment in vertical direction. The sliding rods 19 in their semicircular guides 17, 18 of the pairs of swivel members 9, 10 ensure additional guiding which allows exact adjustment of the emulsion carrier guide. When a desired position is adjusted, clamping follows, because by actuation of the knobs 24 or their turning in opposite direction the clamping member 22 or its rim 25 will clamp the pairs of swivel members 9, 10 and swivel member 15 together to maintain the adjusted position.

In the embodiment shown in Fig. 5 the clamping member 26 has a longitudinal slot 27 engaged by a pin 28 which is provided in radial direction on the bearing collar 14. The clamping member 26 does not perform a rotary motion when moving in axial direction and is provided with internal thread engaged by an operating member 30 having a threaded pin 29. The member 30 is preferably countersunk in the camera body and consists of a folding handle 31 which is held in open and closed position by the action of a spring 32.

In a simplified form, particularly when cameras with small image sizes are concerned, the means effecting release and fixing of the respective position of the emulsion carrier guide according to the invention may be arranged in the fulcrum of the pairs of swivel members 9, 10. In this case, the bearing collar receiving the clamping and operating members for releasing and fixing the emulsion carrier guide 2 in the various positions is constructed also as swivel bearing for the pairs of swivel members 9, 10 and the swivel members 15.

We claim:

1. In a photographic camera having a casing, an adjustable emulsion carrier guide, comprising in combination, a carrier member, two support members pivotally supported about a common support by the casing of said cameras, two connecting members, each of said connecting members being swivelably connected to said carrier member and journalled on one of said two support members, each of said two support members including a slot spaced from said common support, and a clamping member extending through said slot of each support member and being adapted to clampingly hold said two support members.

2. In a photographic camera according to claim 1, including a third support member pivotally supported about said common support, said third member including a third shaped slot and being in overlapping relationship with said two support members, said clamping means also extending through said third slot, said third support member and one of said two support members each having a projecting portion, said projecting portions defining a space between themselves, and a third connecting member pivotally connected to one of said two connecting members and extending into the space defined between said projecting portions so as to be guided therethrough.

3. In a photographic camera having a casing, an adjustable emulsion carrier guide, according to claim 2, including means connecting said third support member to one of said two support members.

4. In a photographic camera having a casing, an adjustable emulsion carrier guide, according to claim 1, wherein said clamping member comprises a sleeve member threadably supported by said casing of said camera, said sleeve member having a portion projecting beyond said slot of each support member, and an actuating knob secured to said sleeve member for turning the same.

5. In a photographic camera having a casing, an adjustable emulsion carrier guide, according to claim 1, wherein said clamping member comprises a sleeve member extending through the casing of said camera, stop means preventing the rotation of said sleeve member about its axis, and an actuating knob threadably supported by said sleeve member for turning the same, said casing including a recess for accommodating said knob.

6. In a photographic camera having a casing, an adjustable emulsion carrier guide, according to claim 1, wherein a portion of said casing extends into the slots of said two support members.

7. In a photographic camera having a housing, an angularly adjustable guiding arrangement for an emulsion medium, comprising a rectangular carrier member adapted to support the emulsion medium for angular movement with respect to said housing about one edge of said housing, a plurality of swivel plates pivotally mounted on said housing on opposite sides of said housing, each of said opposite sides being adjacent to the side facing said carrier member, means for pivoting said swivel plates, one of said plates on each side of said housing extending upwardly from said pivot, one of said plates on each side of said housing extending downwardly from said pivot, a locking bolt passing through said plates on each side of said housing and positioned adjacent the pivot means on each side of said housing, a slot on at least one of said plates on each side of said housing adapted to receive said locking bolt, locking means including thread means whereby said plates are rendered immobile with respect to said housing, first tie bolt means pivotally connected to the upwardly extending ones of said plates on the side of said housing and to said carrier member for moving said carrier member away from said housing, and second tie bolt means connected from each of said downwardly extending plates to said carrier member for allowing upward movement of said carrier member, said carrier member being rendered adjustable in a plurality of angular positions with respect to said housing by selective adjustment of said locking member.

8. In a photographic camera having a casing, a guiding arrangement, comprising in combination, a carrier member adapted to support an emulsion medium, at least two support members pivotally mounted at a common point within the casing of said camera, at least one of said support members being movable into and out of said casing, and guide means pivotally connecting said carrier member to said support members, whereby one portion of said carrier member is moved away from said casing and another portion of said carrier member is held close to said casing to angularly set said carrier member with respect to said casing, said guide means comprising a pair of connecting arms each of said pair of arms being swivelably connected to said carrier member and pivotally connected to one of said two support members.

References Cited in the file of this patent

UNITED STATES PATENTS

| | | |
|---|---|---|
| 409,874 | Shorkley | Aug. 27, 1889 |
| 570,774 | Sanderson | Nov. 3, 1896 |
| 679,881 | Bullard | Aug. 6, 1901 |
| 694,080 | Sanderson | Feb. 25, 1902 |
| 978,027 | Johnson | Dec. 6, 1910 |
| 2,326,025 | Gillon et al. | Aug. 3, 1943 |

FOREIGN PATENTS

| | | |
|---|---|---|
| 4,831 | Great Britain | of 1904 |